(12) United States Patent
Oh et al.

(10) Patent No.: US 10,118,550 B2
(45) Date of Patent: Nov. 6, 2018

(54) LIGHT CONTROL APPARATUS, VEHICLE HAVING THE LIGHT CONTROL APPARATUS, AND METHOD FOR CONTROLLING THE VEHICLE

(71) Applicants: Hyundai Motor Company, Seoul (KR); Kia Motors Corporation, Seoul (KR)

(72) Inventors: Mingi Oh, Gyeonggi-do (KR); Hyungjin Park, Incheon (KR); Nuri Jeon, Gyeongsangnam-do (KR)

(73) Assignees: Huyndai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/617,540

(22) Filed: Jun. 8, 2017

(65) Prior Publication Data

US 2018/0229653 A1    Aug. 16, 2018

(30) Foreign Application Priority Data

Feb. 13, 2017  (KR) ........................ 10-2017-0019375

(51) Int. Cl.
- *B60Q 9/00* (2006.01)
- *H05B 33/08* (2006.01)
- *B60Q 3/18* (2017.01)
- *B60Q 3/70* (2017.01)

(52) U.S. Cl.
CPC ................. *B60Q 9/00* (2013.01); *B60Q 3/18* (2017.02); *B60Q 3/70* (2017.02); *H05B 33/0854* (2013.01)

(58) Field of Classification Search
CPC ........ H05B 33/0854; B60Q 9/00; B60Q 3/18; B60Q 3/70
USPC .......................................................... 340/455
See application file for complete search history.

(56) References Cited

U.S. PATENT DOCUMENTS

| | | | |
|---|---|---|---|
| 8,179,245 B2* | 5/2012 | Chander | B60L 11/1818 340/455 |
| 9,789,783 B2* | 10/2017 | Grider | B60L 11/1861 |
| 9,862,304 B2* | 1/2018 | Watase | B60Q 1/1423 |
| 2006/0214637 A1* | 9/2006 | Gonzales | B60L 11/1824 320/128 |
| 2009/0040033 A1* | 2/2009 | Uchida | B60K 6/28 340/439 |

(Continued)

*Primary Examiner* — Omar Casillashernandez
(74) *Attorney, Agent, or Firm* — Mintz Levin Cohn Ferris Glovsky and Popeo, P.C.; Peter F. Corless

(57) ABSTRACT

A light control apparatus for controlling brightness of a lighting unit indicating a charging state of a battery of a vehicle includes: an interface configured to communicate with an external illuminance detector; a memory configured to store illuminance information corresponding to a first reference illuminance and a second reference illuminance lower than the first reference illuminance and to store brightness information set based on the first reference illuminance and the second reference illuminance; a controller configured to receive the illuminance information via the interface, to set the brightness information based on the first reference illuminance and the second reference illuminance, and to control the brightness of the lighting unit based on the set brightness information; and a driver configured to regulate power of the lighting unit in response to a command of the controller.

19 Claims, 8 Drawing Sheets

(56) References Cited

U.S. PATENT DOCUMENTS

| | | | | |
|---|---|---|---|---|
| 2011/0084819 A1* | 4/2011 | Bergum | ............... | H01M 10/48 |
| | | | | 340/425.5 |
| 2012/0075090 A1* | 3/2012 | Satake | ................... | B60K 37/02 |
| | | | | 340/455 |
| 2014/0152711 A1* | 6/2014 | Sekiya | ................... | G02B 27/01 |
| | | | | 345/690 |
| 2015/0008823 A1* | 1/2015 | Lim | ........................ | B60Q 1/30 |
| | | | | 315/77 |
| 2015/0360578 A1* | 12/2015 | Duan | ................. | B60L 11/1861 |
| | | | | 340/455 |
| 2017/0361720 A1* | 12/2017 | Huang | ............... | B60L 11/1824 |

* cited by examiner

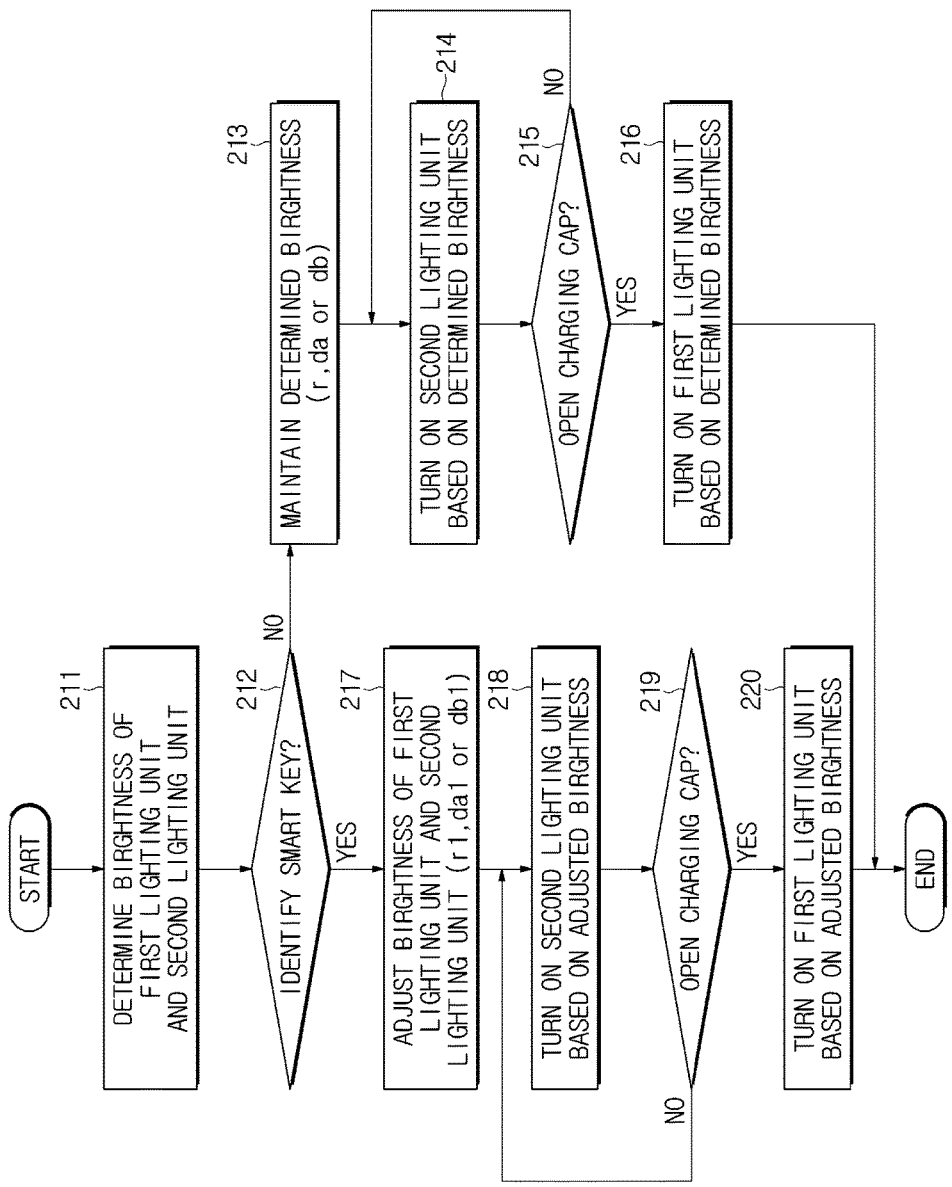

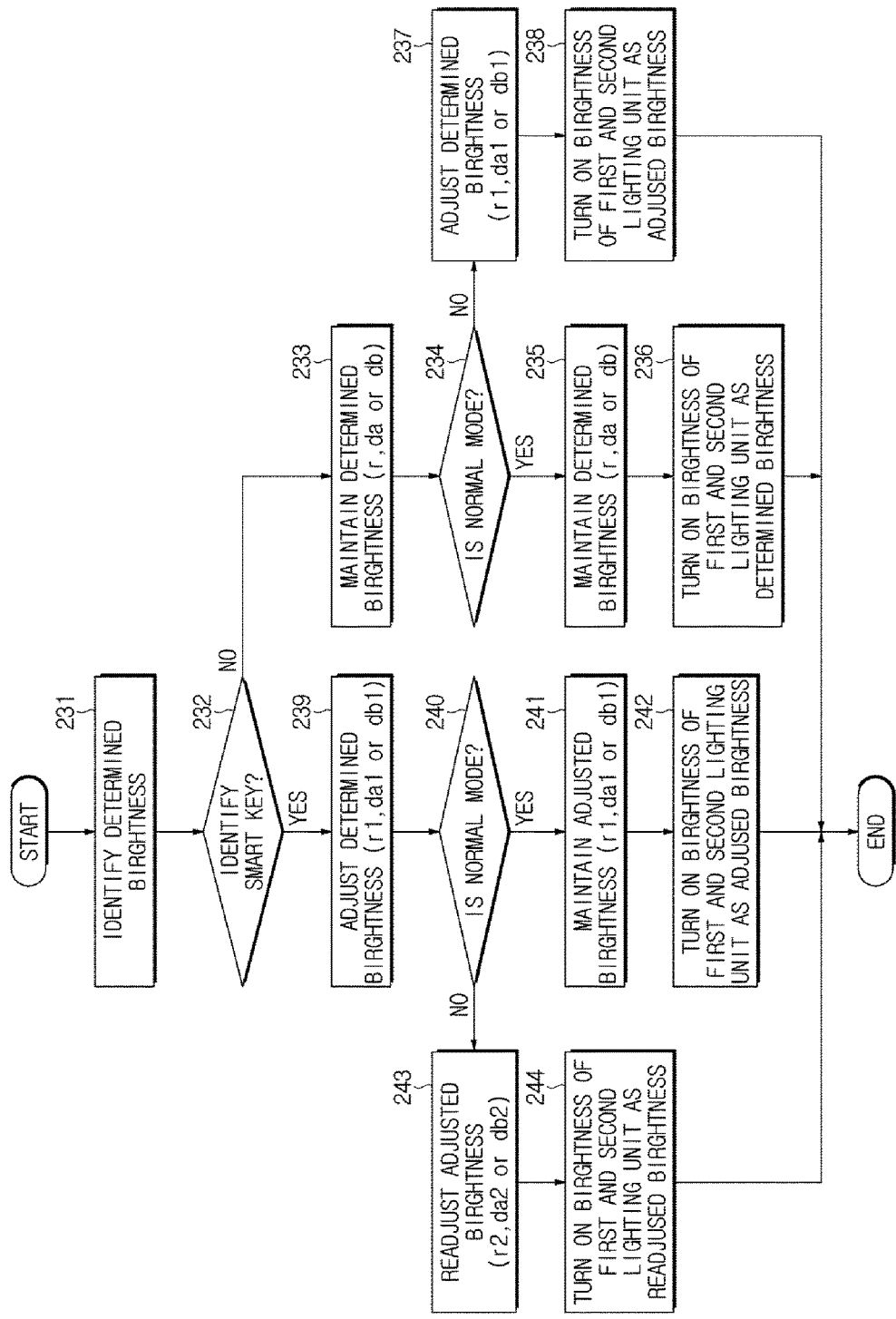

_US 10,118,550 B2_

LIGHT CONTROL APPARATUS, VEHICLE HAVING THE LIGHT CONTROL APPARATUS, AND METHOD FOR CONTROLLING THE VEHICLE

CROSS-REFERENCE TO RELATED APPLICATION

This application claims the benefit of priority to Korean Patent Application No. 10-2017-0019375, filed on Feb. 13, 2017 in the Korean Intellectual Property Office, the disclosure of which is incorporated by reference in its entirety as if fully set forth herein.

BACKGROUND

1. Technical Field

Embodiments of the present disclosure relate generally to a light control apparatus and, more particularly, to a light control apparatus configured to display a charging state of a rechargeable battery, a vehicle having the light control apparatus, and a method for controlling the vehicle.

2. Description of the Related Art

Eco-friendly vehicles travel on the road using electricity as its power source so as to improve fuel efficiency and reduce the amount of discharged harmful gas. Eco-friendly vehicles include an electric vehicle and a hybrid vehicle. The electric vehicle may include a motor and a rechargeable battery as a power source, may rotate the motor using power of the rechargeable battery, and may drive the wheels using the rotation of the motor.

Meanwhile, the hybrid vehicle may include an engine, a battery, and a motor, and may travel on the road using mechanical power of the engine and electric power of the motor. The hybrid vehicle may travel in an electric vehicle (EV) mode in which power of the motor is used only, or may travel in a hybrid electric vehicle (HEV) mode in which power of the engine and power of the motor are used. The hybrid vehicle may also perform a regenerative braking (RB) mode in which braking energy or inertial energy is recovered through electric generation of the motor during braking or coasting caused by inertia so as to charge the battery. In addition, the hybrid vehicle may control a starter generator to operate as a generator by engine power, and may control a starter generator to operate as a generator by power delivered through the engine in an energy regenerative mode so that the battery can be charged.

A charger installed in a parking lot, a charging station, or the like can be used to charge the battery of an eco-friendly vehicle. If a wire plug of a charger is connected to a battery plug of the eco-friendly vehicle, the vehicle may receive power from the battery, and may charge the battery with the received power. However, it is difficult for a user to recognize a charging state of the battery in the eco-friendly vehicle.

SUMMARY

Therefore, it is an aspect of the present disclosure to provide a light control apparatus for controlling brightness of a lighting unit positioned in at least one of a charging unit and a dashboard based on charging state information of a battery and external illuminance, a vehicle having the light control apparatus, and a method for controlling the vehicle.

It is another aspect of the present disclosure to provide a light control apparatus for controlling brightness of a lighting unit based on at least one of a presence/absence of a user and a charging mode, a vehicle having the light control apparatus, and a method for controlling the vehicle.

In accordance with embodiments of the present disclosure, a light control apparatus for controlling brightness of a lighting unit indicating a charging state of a battery of a vehicle includes: an interface configured to communicate with an external illuminance detector; a memory configured to store illuminance information corresponding to a first reference illuminance and a second reference illuminance lower than the first reference illuminance and to store brightness information set based on the first reference illuminance and the second reference illuminance; a controller configured to receive the illuminance information via the interface, to set the brightness information based on the first reference illuminance and the second reference illuminance, and to control the brightness of the lighting unit based on the set brightness information; and a driver configured to regulate power of the lighting unit in response to a command of the controller.

The brightness information may include: i) a first target brightness corresponding to an illuminance higher than or equal to the first reference illuminance, ii) a second target brightness corresponding to an illuminance lower than the second reference illuminance, and iii) a reference brightness corresponding to an illuminance higher than or equal to the second reference illuminance and lower than the first reference illuminance.

The controller may control the driver so that the lighting unit emits light brighter than a brightness according to the set brightness information after a predetermined time elapses from when a charging is started.

The controller may control the driver so that the lighting unit emits light brighter than a brightness according to the set brightness information when a charging state of the battery is a charging failure state.

The controller may control the driver so that the lighting unit emits light brighter than a brightness according to the set brightness information at a predetermined time prior to a scheduled time when a charging mode of the battery is a reservation mode.

Furthermore, in accordance with embodiments of the present disclosure, a vehicle includes: a rechargeable battery; a motor configured to generate a torque using power of the battery and to transmit the generated torque to a wheel of the vehicle; a lighting unit configured to indicate a charging state of the battery; a memory configured to store illuminance information corresponding to a first reference illuminance and a second reference illuminance lower than the first reference illuminance and to store brightness information set based on the first reference illuminance and the second reference illuminance; an illuminance detector configured to detect an illuminance; a controller configured to set the brightness information based on the first reference illuminance and the second reference illuminance, and to control brightness of the lighting unit based on the set brightness information; and a driver configured to regulate power of the lighting unit in response to a command of the controller.

The vehicle may further include a charge amount detector configured to detect an amount of charge of the battery. The lighting unit includes a plurality of lamps, the memory is further configured to store information corresponding to a number of the plurality of lamps to be turned on for lighting operation based on the detected amount of charge of the battery, and the controller is further configured to the lighting operation of at least one of the plurality of lamps based on the information stored in the memory and the detected amount of charge of the battery.

The brightness information stored in the memory may include: i) a first target brightness corresponding to an illuminance higher than or equal to the first reference illuminance, ii) a second target brightness corresponding to a illuminance lower than the second reference illuminance, and iii) a reference brightness corresponding to a illuminance higher than or equal to the second reference illuminance and lower than the first reference illuminance.

The vehicle may further include a communication interface configured to communicate with a smart key. The controller adjusts the set brightness based on a predetermined brightness when a communication with the smart key is performed.

The controller may maintain a brightness of the lighting unit as the brightness set by the detected illuminance when the communication with the smart key is not performed.

The controller may control the driver such that the lighting unit emits light brighter than the adjusted brightness when the communication with the smart key is performed after a predetermined time elapses from when a charging is started, and control the driver such that the lighting unit emits light brighter than a brightness according to the set brightness information when the communication with the smart key is not performed after the predetermined time elapses from when the charging is started.

The controller may control the driver such that the lighting unit emits light brighter than the adjusted brightness when the communication with the smart key is performed and the charging state of the battery is the charging failure state, and control the driver such that the lighting unit emits light brighter than a brightness according to the set brightness information when the communication with the smart key is not performed and the charging state of the battery is the charging failure state.

When a charging mode of a battery is a reservation mode, the controller may determine whether a present time is prior to a scheduled time, and when the present time is prior to the scheduled time, determine whether the communication with the smart key is performed, and when the communication with the smart key is performed, control the driver such that the lighting unit emits light brighter than the adjusted brightness, and when the communication with the smart key is not performed, control the driver such that the lighting unit emits light brighter than a brightness according to the set brightness information.

The lighting unit may be provided in a dashboard.

The lighting unit may be provided in a charging unit. The charging unit is connected to an external plug.

The vehicle may further include a charging cap provided in the charging unit; an opening/closing detector configured to detect information corresponding to an opening state and closing state of the charging cap. The controller determines whether the charging cap is in the opening state based on the detected information by the opening/closing detector, when the charging cap is in the opening state, activates a lighting operation of the lighting unit, and when the charging cap is in the closing state, activates an off-operation of the lighting unit.

Furthermore, in accordance with embodiments of the present disclosure, a method for controlling a vehicle including a battery and a motor includes: identifying a state of the battery; activating an on-operation or an off-operation of a lighting unit based on the identified state of the battery; detecting an external illuminance; determining a first reference illuminance and a second reference illuminance lower than the first reference illuminance, the first reference illuminance and the second reference illuminance stored in a memory; setting brightness information based on the first reference illuminance and the second reference illuminance; and controlling brightness of the lighting unit based on the detected illuminance, the first reference illuminance, the second illuminance and the determined brightness information of the light unit.

A plurality of brightness levels may include: i) a first target brightness corresponding to an illuminance higher than or equal to the first reference illuminance, ii) a second target brightness corresponding to a illuminance lower than the second reference illuminance, and iii) a reference brightness corresponding to a illuminance higher than or equal to the second reference illuminance and lower than the first reference illuminance. The first target brightness is higher than the reference brightness and the second target brightness, and the second target brightness is lower than the reference brightness. The setting of the brightness information includes: determining the brightness of the lighting unit as the first target brightness when the external illuminance is equal to or higher than the first reference illuminance, determining the brightness of the lighting unit as the second target brightness when the external illuminance is lower than the second reference illuminance, and determining the brightness of the lighting unit as the reference target brightness when the external illuminance is equal to or higher than the second reference illuminance and is lower than the first reference illuminance.

The control method may further include determining whether communication with a smart key is performed; and adjusting the determined brightness based on a predetermined brightness when the communication with the smart key is performed.

The control method may further include: identifying a charging mode of the battery; determining whether a present time is prior to a scheduled time when the charging mode of the battery is a reservation mode; and adjusting power of a driver such that the lighting unit emits light brighter than a brightness according to the set brightness information when the present time is prior to a scheduled time.

The control method may further include determining whether the battery state is a charging failure state based on the identified amount of charge; and adjusting the brightness of the lighting unit to be brighter than the determined brightness when the battery state is a charging failure state.

The activating of the on-operation or the off-operation of the lighting unit includes: controlling an on-operation of a plurality of first lamps of the first lighting unit provided in a charging unit, and a plurality of second lamps of the second lighting unit provided in a dashboard.

The control method may further include: adjusting the brightness of the lighting unit to be brighter than the adjusted brightness after a predetermined time elapses from when a charging is started; maintaining the brightness of lighting unit as the adjusted brightness during a preset time; and adjusting the brightness of the lighting unit according to the adjusted brightness when the preset time elapses.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 6, 7 and 8 are flowcharts illustrating a method for the light control apparatus of the vehicle in accordance with embodiments of the present disclosure.

FIG. 6 is a flowchart illustrating a method for determining a brightness of a lighting unit based on illuminance.

FIG. 7 is a flowchart illustrating a method for adjusting a brightness of lighting unit based on recognition information of a smart key, battery charge information and opening/closing information of a charging cap.

FIG. 8 is a flowchart illustrating a method for adjusting a brightness of lighting unit based on recognition information of the smart key and a charging mode of the battery.

Figure 1:
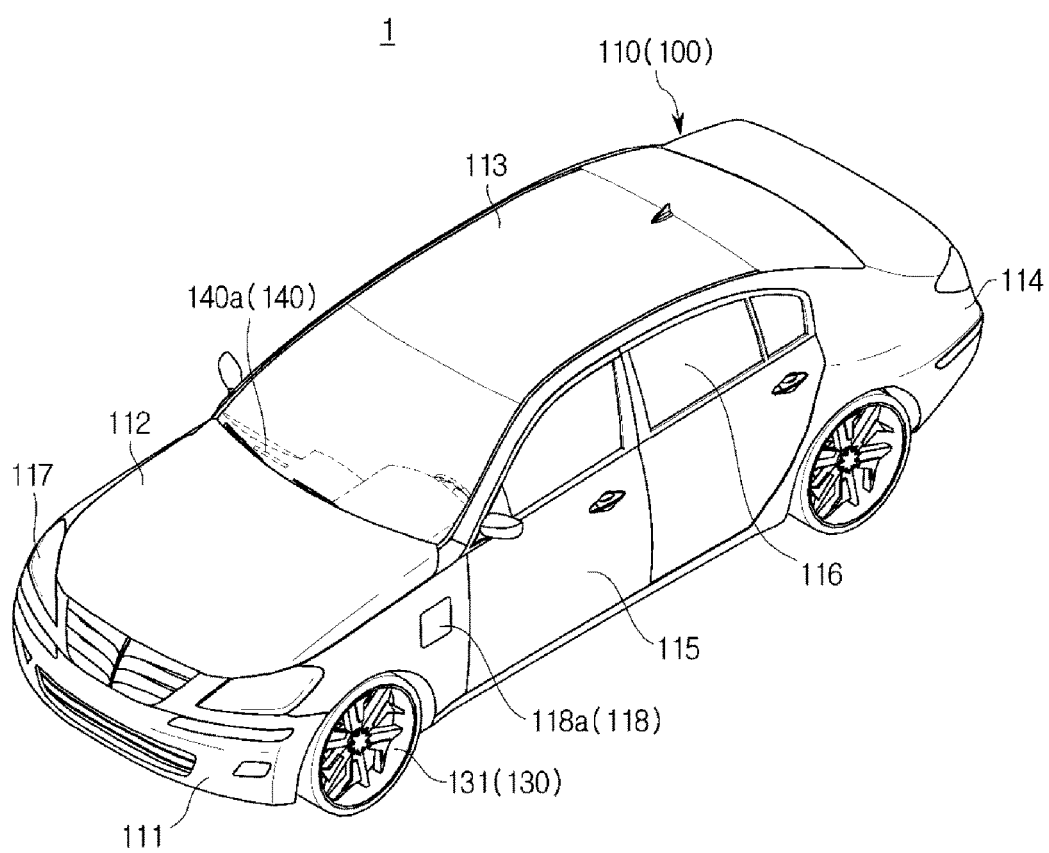
FIG. 1 is a perspective view illustrating an external appearance of a vehicle in accordance with embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Embodiments will now be described more fully hereinafter with reference to the accompanying drawings. The embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to the exemplary embodiments of the present disclosure, examples of which are illustrated in the accompanying drawings, wherein like reference numerals refer to like elements throughout.

Figure 2:
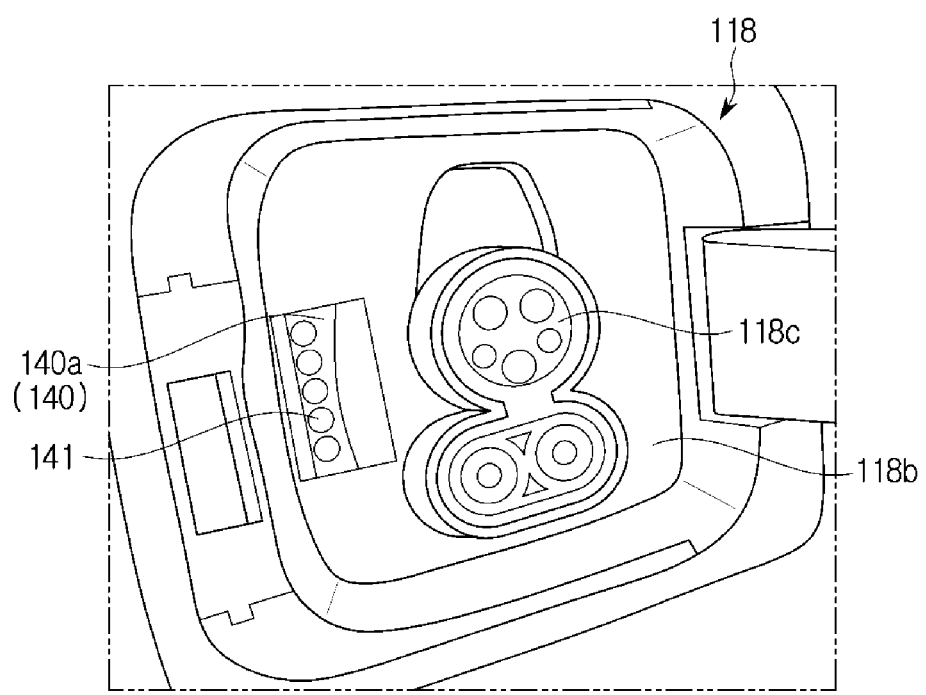
FIG. 2 is a perspective view illustrating a charging unit of a vehicle in accordance with embodiments of the present disclosure.
Figure 3:
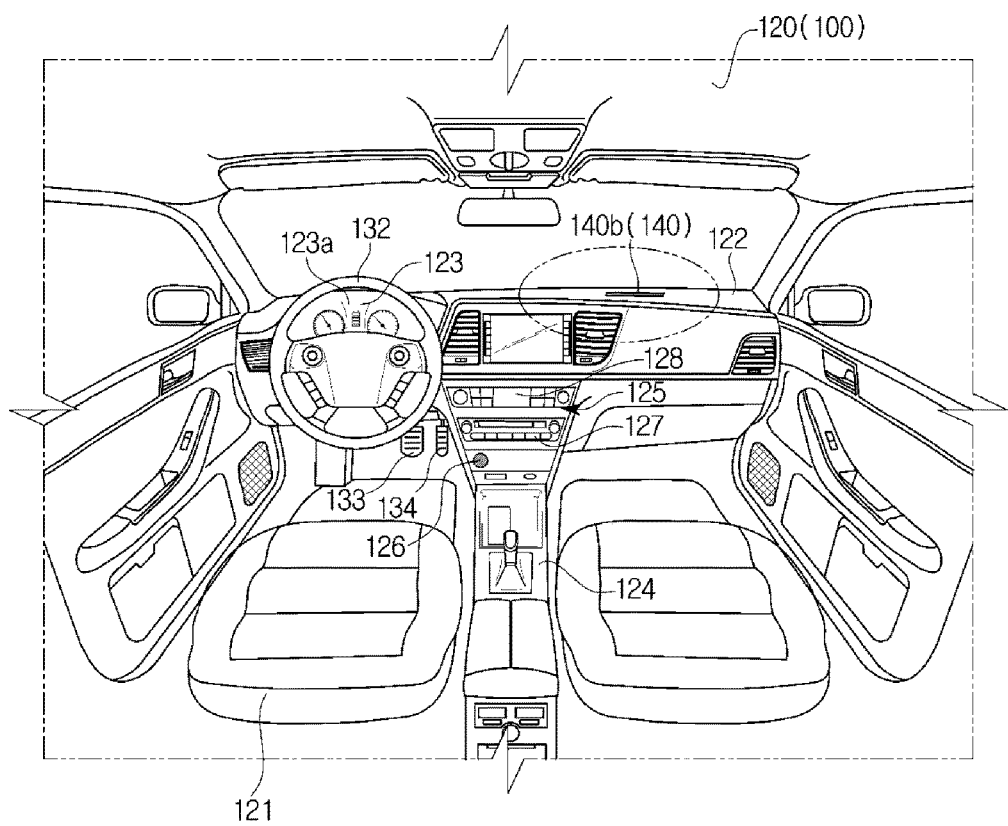
FIG. 3 is a view illustrating an internal structure of the vehicle in accordance with embodiments of the present disclosure.
Figure 4:
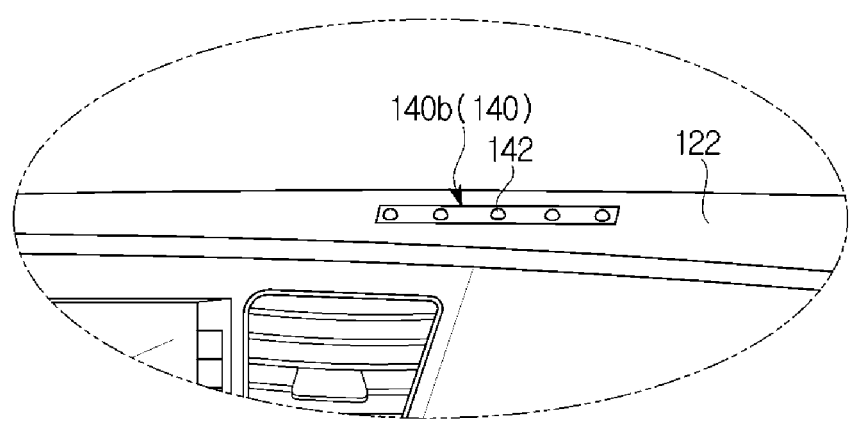
FIG. 4 is a view illustrating a dashboard of the vehicle of FIG. 3.

FIG. 1 is a perspective view illustrating the external appearance of a vehicle according to embodiments of the present disclosure. FIG. 2 is a perspective view illustrating the charging unit of a vehicle according to embodiments of the present disclosure. FIG. 3 is a view illustrating the internal structure of the vehicle according to embodiments of the present disclosure. FIG. 4 is a view illustrating the dashboard of the vehicle according to embodiments of the present disclosure.

The vehicle according to embodiments of the present disclosure is an eco-friendly vehicle, such as an electric vehicle, a plug-in hybrid electric vehicle (PHEV), etc., configured to travel on the road using a battery and a motor.

A vehicle 1 may include a body 100 having interior and exterior parts, and a chassis which is a remaining portion other than the body 100 and is equipped with mechanisms required for driving thereof.

As shown in FIG. 1, an exterior part 110 of the body 100 may include a front panel 111, a bonnet (also called a hood) 112, a roof panel 113, a rear panel 114, and front-rear and left-right doors 115, and a plurality of window glasses 116 respectively installed in the front, rear, left, and right doors 115 in such a way to be able to be opened or closed.

Also, the exterior 110 of the body may include a plurality of pillars provided at the borders between the front, rear, left, and right doors 115 and the window glasses 116, a plurality of side-view mirrors to provide a driver with the rear view of the vehicle 1, and an external lamp 117 to enable the driver to easily see information of surroundings while keeping his/her eyes forward, and to perform a function of signaling or communicating with other vehicles and pedestrians.

The exterior part 110 of the body 100 may further include a charging unit 118. The charging unit 118 include a charging cap 118a, a receiving part 118b having a receiving space and a charging hole 118c installed in the receiving part 118b. The receiving part 118b is opened and closed by the charging cap 118a. An external plug may be inserted and connected to the charging hole 118c. The charging hole 118c may be provided in a type of plug or a type of socket. The charging unit 118 may be provided with a lighting unit 140, 140a for outputting charging information of the battery. The charging information may include an amount of charge of the battery, a charging mode of the battery, charging completion information of the battery, and charging failure information of the battery.

The lighting unit 140, 140a may include a plurality of lamps 141. The lamps may be light-emitting diode (LED). The plurality of lamps 141 of the lighting unit 140, 140a may be turned on, off, or blinked, and brightness may be adjusted by the light control apparatus. That is, the plurality of lamps 141 of the lighting unit 140, 140a may be lighted at brightness corresponding to a control command of the light control apparatus.

The exterior configuration of vehicle 1 described above and illustrated in FIG. 1 is provided for demonstration purposes only and does not limit the scope of the present application.

Referring next to FIG. 3, an interior part 120 of the body 100 includes seats 121 on which a passenger is seated; a dashboard 122; an instrument panel 123 (i.e., a cluster) (including a tachometer, a speedometer, a coolant thermometer, a fuel gauge, a turn signal indicator, a high beam indicator light, a warning light, a seat belt warning light, a mileage indicator, an odometer, an automatic transmission shift indicator, a door open warning light, an engine oil warning light, and a fuel shortage warning light, which are arranged on the dashboard 122 to output information related to driving); a center fascia 124 including an air vent of the air conditioner, a control panel, and an audio device; a heat unit 125 located in the center fascia 124, and to receive operation commands from the audio device and the air conditioner; and a starting part 126 located in the center fascia 124, and to receive an ignition command.

The seats 121 may be seats on which a vehicle driver and passengers can be safely and pleasantly seated. The seats 121 may include a driver's seat 121a for the vehicle driver, a passenger seat 121b for a fellow passenger, and a rear seat arranged in the rear of the vehicle 1.

The cluster 123 may be provided with a display 123a for improving information providing efficiency of various types of information. The display 123a of the cluster 123 may display an icon image corresponding to the amount of charge of the battery.

The display 123a is provided with a liquid crystal display (LCD) or organic light emitting diodes (OLED). The cluster 123 may be implemented in a digital fashion.

The starting part 126 of the vehicle may include a starting button to be pressed by a user's finger or to receive a user touch signal, or may include a key box into which a key is inserted.

The head unit 125 may include an input 127 configured to receive an input of a command of a user for controlling the audio device, the air conditioning device, the hot wire of the seat, the charging mode of the battery, and the like. The head unit 125 may include a display 128 configured to display operation information to be input by the user and to display information about a function being performed by the vehicle 1.

The input 127 may be disposed in the center fascia 124. The input 127 may include at least one physical button, such as on/off buttons for executing or stopping various functions, buttons for changing setting values of the various functions, etc. The input 127 may further include a jog dial (not shown) or a touch pad (not shown) to enable a user to input commands for moving or selecting a cursor displayed on the display of a terminal. The input 127 may include an input device.

The interior configuration of vehicle 1 described above and illustrated in FIG. 3 is provided for demonstration purposes only and does not limit the scope of the present application.

Referring next to FIG. 4, the dashboard 122 may be provided with a lighting unit 140:140b for outputting charging information of the battery.

Here, the charge information may include the amount of charge of the battery, a charging mode of the battery, charging completion information of the battery, and charging failure information of the battery.

The lighting unit 140, 140b may include a plurality of lamps 142, which may be light-emitting diode (LED). The plurality of lamps 142 of the lighting unit 140, 140b may be turned on, off, or blinked, and brightness may be adjusted by the light control apparatus. That is, the plurality of lamps 142 of the lighting unit 140, 140b may be turned on at a brightness corresponding to a control command of the light control apparatus.

The lighting unit 140:140b provided on the dashboard may be visually recognized by the user. The lighting unit 140 (140a and 140b) may display charging information using a liquid crystal display (LCD).

The vehicle's chassis 130 is a frame for supporting the vehicle body. The chassis may include wheels 131 disposed at front, rear, left, and right sides of the chassis, power devices for applying driving force to the front, rear, left and right wheels 131, a braking device and a suspension device for applying a braking force to the braking device 131

The power devices may include a power generating device and a power transferring device.

The power generating device of the electric vehicle may include the battery and the motor. The power transmission device of the electric vehicle may include at least one of a clutch, a transmission, a final reduction gear, a differential gear, and an axle. When the starting button (or booting button) of the electric vehicle is turned on, a maximum current is supplied to the motor, so that a maximum torque occurs.

The power generating device of a hybrid electric vehicle may include the battery, the motor, an engine (not shown), a fuel supplier (not shown), a cooler (not shown) and an oil supplier (not shown). The battery may generate power of high-voltage current, and supply the generated power to various components installed in the vehicle 1. The motor may convert electrical energy stored in the battery into mechanical energy for operating various components installed in the vehicle 1.

When the starting button is turned on, the hybrid electric vehicle may operate the motor, and operate the engine using the operation of the motor. The hybrid electric vehicle may be the plug-in hybrid electric vehicle (PHEV) to perform a charging operation using an external power.

The vehicle may include a steering wheel 132 of the steering device to steer the vehicle 1, a brake pedal 133 depressed by the driver's foot according to the driver's brake intention, and an accelerator pedal 134 depressed by the driver according to the driver's acceleration intention, as shown in FIGS. 1 and 2.

Figure 5:
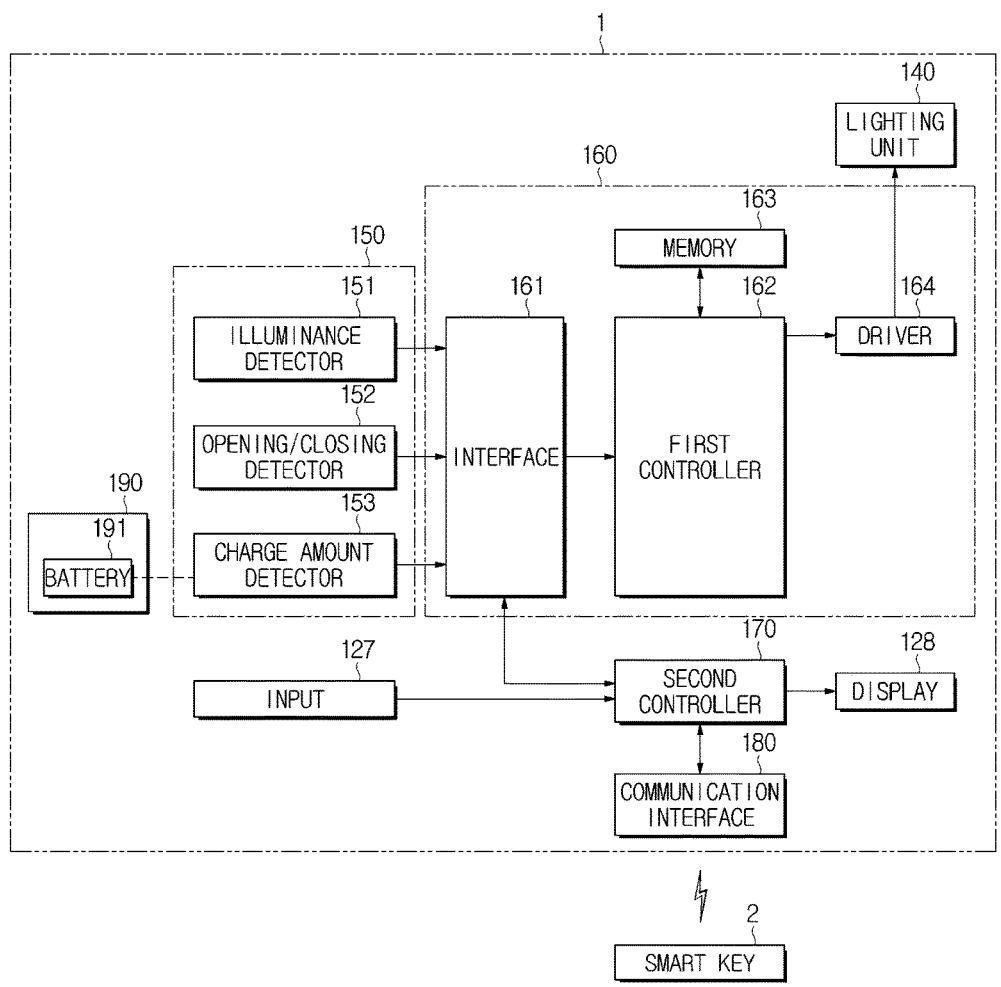
FIG. 5 is a control block diagram illustrating the vehicle in accordance with embodiments of the present disclosure.

FIG. 5 is a control block diagram illustrating the vehicle according to an embodiment of the present disclosure. The following description will be given by referring to FIGS. 2 and 4 together.

The vehicle includes the input 127, the display 128, the lighting unit 140, a detector 150, the light control apparatus 160, a second controller 170, a communication interface 180, and a power supplier 190.

The vehicle may communicate with a smart key 2.

The input 127 may receive the charging mode. The charging mode may include a normal mode to instruct a charging operation at present time, and a reservation mode to instruct the charging operation at scheduled time.

The display 128 may display the charging mode of battery and the charging state of battery. The charging state of the battery may include a charging entrance state, a charging progress state, a charging completion state, and a charging failure state.

The lighting unit 140 may include the first lighting unit 140a disposed in the charging unit 118, and the second lighting unit 140b disposed in the dashboard 122. The first lighting unit 140a may include a plurality of first lamps 141, and a second lighting unit 140b may include a plurality of second lamps 142.

The plurality of first lamps 141 may be lamps of the same color or lamps of different colors. The plurality of second lamps 142 may be lamps of the same color or lamps of different colors. The plurality of first lamps 141 and the plurality of second lamps 142 may be light-emitting diodes (LED).

Each of the plurality of first lamps 141 and the plurality of second lamps 142 of the lighting unit 140 may be controlled by the light control apparatus 160.

The detector 150 detects information for controlling a displaying of the charging state of the battery. The detector 150 may include an illuminance detector 151 for detecting external illuminance, an opening/closing detector 152 for detecting opening/closing state of the charging cap 118a, and a charge amount detector 153 for detecting a charged amount of the battery.

The opening/closing detector 152 may include at least one of a micro switch, a reed switch, an ultrasonic sensor, an infrared sensor, a proximity sensor, a contact sensor, and a magnetic sensor.

The charge amount detector 153 may indirectly detect the charged amount of battery. The charge amount detector 153 detects a current of the battery or detects a voltage of the battery to detect the charged amount of the battery. That is, the charge amount detector 153 may include at least one of a current detector for detecting the battery current and a voltage detector for detecting the battery voltage.

The light control apparatus 160 controls the lighting unit to be turned on, off or blinked, sets brightness of the lighting unit 160 based on the information detected by the detector 150 during the lighting control of the lighting unit, and controls the lighting unit 140 at the set brightness. The light control apparatus 160 includes an interface 161, a first controller 162, a memory 163, and a driver 164.

The interface 161 electrically and mechanically connects the detector 150 and the first controller 162, receives the information detected by the detector 150, and transmits the received information to the first controller 162. The interface 161 electrically and mechanically connects the second controller 170 and the first controller 162, receives information from the second controller 170, and transmits information to the second controller. The interface 161 may perform a communication function among the detector 150, the second controller 170 and the first controller 161, and may perform a communication function between the input 127 and the display 128. The interface 161 may perform communication in a wired or wireless manner.

The first controller 162 may acquire the amount of charge of the battery on the basis of the information detected by the charge amount detector 153. The information detected by the charge amount detector 153 may include at least one of the current of battery and the voltage of the battery.

The first controller 162 may identify the acquired amount of charge of the battery, determine the number of first lamps to be turned on among the plurality of first lamps 141 of the first lighting unit 140a based on the identified amount of charge of the battery, and determine the number of second lamps to be turned on among the plurality of first lamps 141 of the second lighting unit 140b based on the identified amount of charge of the battery. The first controller 162 identifies the opening and closing state of the charging cap 118a based on the detection information of the opening/closing detector 152, controls the lighting operation of the second lighting unit 140b when the charging cap 118a is closed, and controls the lighting operation of the first lighting unit 140a and the second lighting unit 140b when the charging cap 118a is opened.

The first controller 162 identifies the opening and closing state of the charging cap 118a based on the detection information of the opening/closing detector 152, allows the first lighting unit 140a and the second lighting unit 140b to be turned on when the charging cap 118a is opened, and allows the first lighting unit 140a and the second lighting unit 140b to be turned off when the charging cap 118a is closed.

When the charging state of the battery is the charging failure state, the first controller 162 may control a blinking operation of at least one of the first lighting unit and second lighting unit. When the charging state of the battery is the charging failure state, the first controller 162 may allow the brightness of at least one of the first lighting unit and second lighting unit to be brighter than the determined brightness.

If a predetermined time elapsed from when a charging is started, the first controller 162 may control a blinking operation of at least one of the first lighting unit and second lighting unit. If a predetermined time elapsed from when a charging is started, the first controller 162 may allow the brightness of at least one of the first lighting unit and second lighting unit to be brighter than the determined brightness. The charging time of the battery is a time counted from the start time of the charging operation of the battery.

When the present time is at a second predetermined time prior to a scheduled time, the first controller 162 may control a blinking operation of at least one of the first lighting unit and second lighting unit. When the present time is at the second predetermined time prior to the scheduled time, the first controller 162 may control the brightness of at least one of the first lighting unit and second lighting unit to be brighter than the determined brightness. The first controller 162 may determine whether the charging fails based on a change in the amount of charge of the battery.

When controlling the brightness of at least one of the first lighting unit 140*a* and the second lighting unit 140*b*, the first controller 162 may control a total brightness of the lighting unit by controlling the number of lamps to be turned on among the plurality of lamps, or control the total brightness of the lighting unit by adjusting the power supplied to each of the plurality of lamps. The power may include at least one of a current and a voltage.

When controlling the lighting operation and blinking operation of at least one of the first lighting unit 140*a* and the second lighting unit 140*b*, the first controller 162 may identify the determined brightness, and control brightness the at least one lighting unit as the identified brightness.

Hereinafter a configuration of the first controller setting brightness of the lighting unit will be described.

The first controller 162 identify the detected illuminance, and determines the brightness of the first and second lighting units as any one of a first target brightness, a second target brightness and a reference brightness based on a first reference illuminance, a second reference illuminance and the plurality of brightness stored in the memory and the detected illuminance. That is, the first controller 162 primarily controls the brightness the first and second lighting units based on the detected illuminance.

The first controller 162 determines whether the user is present based on communication information with the smart key before entering the charging operation, adjusts the brightness of the first and second lighting units such that the first and second lighting units emits light more brightly than the determined brightness based on presence information of the user. The first controller 162 adjusts the determined brightness to be brighter by a first predetermined brightness. That is, the first controller 162 secondary controls the brightness of the first and second lighting units based on communication information with the smart key. The first controller 162 identifies the charging mode input by the input 127, adjusts the brightness of the first and second lighting units such that the first and second lighting units emits light more brightly than the adjusted brightness based on the identified charging mode and communication information with the smart key.

The first controller 162 adjusts the adjusted brightness to be brighter by a second predetermined brightness. That is, the first controller 162 tertiary controls the brightness of the first and second lighting units based on communication information with the smart key and the identified charging mode. The first controller 162 may set a brightness of the first and second lighting units based on the detected illuminance, the communication information with the smart key and the identified charging mode, and control the lighting operation of the first and second lighting units based on the set brightness.

The charging mode may include the normal mode to instruct the charging operation at present time, and the reservation mode to instruct the charging operation at scheduled time. The first controller 162 may light the plurality of lamps of first and second lighting units in different colors based on the charging mode of the battery and the charging state of the battery. The charging state of the battery may include the charging entrance state, the charging progress state, the charging completion state, and the charging failure state.

The first controller 162 may receive information corresponding to the charging state of the battery from the second controller. The first controller 162 may control the lamps of the first and second lighting units in different colors in the normal mode and the reservation mode. The first controller 162 may receive directly the detected information from the detector 150 and receive directly the communication information with the smart key by communicating with the communication interface. The first controller 162 may receive indirectly the detected information of the detector 150 through the second controller 170, and receive indirectly the communication information of the communication interface through the second controller 170. The first controller 162 may control the driver so that the lighting unit emits light.

The memory 163 stores information for adjusting a brightness of the lighting unit. The information stored in the memory 163 may include illuminance Information, time information and brightness information. The illuminance Information, time information and brightness information may be illuminance data, time data and brightness data. The illuminance Information, the time information and the brightness information may be illuminance values, time values and brightness values.

The memory 163 may store identification (ID) information of the smart key 2, and illuminance information corresponding to the first reference illuminance and the second reference illuminance. The second reference illuminance is lower than the first reference illuminance. The memory 163 may store brightness information corresponding to a plurality of brightness set based on the first illuminance and the second reference illuminance.

The plurality of brightness includes a first target brightness corresponding to an illuminance equal to or higher than the first reference illuminance, a second target brightness corresponding to a illuminance lower than the second reference illuminance, and a reference brightness corresponding to a illuminance equal to or higher than the second reference illuminance and lower than the first reference illuminance.

The memory 163 may a first predetermined brightness and a second predetermined brightness. The first predetermined brightness and the second predetermined brightness may be equal to each other or may be different from each other. The memory 163 may store time information corresponding to a first predetermined time and a second predetermined time. The memory 163 may store the number of the lamps to be turned on corresponding to the amount of charge of the battery, store the number of the lamps to be turned on corresponding to the brightness information of the lighting unit, and store the power of the lamps information corresponding to the brightness information of the lighting unit.

The driver 164 operates the lighting operation of at least one of the first lighting unit and the second lighting unit based on the command of the first controller 162, and adjusts the brightness of the lighting unit to be operated. The driver 164 adjusts the power to each of the plurality of lamps of the first and second lighting units. That is, the driver 164 adjusts the magnitude of the current applied to each of the plurality of lamps of the first and second lighting units. The driver 164 may control the brightness of the plurality of lamps by adjusting the magnitude of the voltage applied to each of the plurality of lamps of the first and second lighting units.

Although the memory 163 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto. The memory 163 may be a memory that is implemented as a separate chip independent of the above processor related to the controller, or may be implemented as a processor and a single chip.

In this case, the memory and the processor of the first controller may be implemented as different chips as necessary. Alternatively, the memory 163 and the processor of the first controller may be implemented as a single chip.

The second controller 170 may be any one of an electronic control unit (ECU), a microprocessor, a CPU, and a processor configured to control the traveling of the vehicle, to control a communication with the external device, and to control the operation of the external lamps. If the second controller 170 is capable of communicating with the smart key 2, the second controller 170 may transmit information of the smart key to the first controller 162. If the information input to the input 127 corresponds to the lighting control, the second controller 170 transmits the input information to the first controller 162.

The second controller 170 may control the display 128 so that the display 128 displays the information input by the input 127, and may control the display 128 to display the charging information of the battery transmitted from the first controller 162. The second controller 170 may confirm the amount of charge of the battery, check the charging state of the battery based on the confirmed amount of charge, and transmit information corresponding to the checked charging state of the battery to the first controller 162.

The charging state of the battery may include the charging entrance state, the charging progress state, the charging completion state, and the charging failure state. The second controller 170 may determine whether the charging of the battery fails based on the confirmed amount of charge. The second controller 170 may be any one of an electronic control unit (ECU), a microprocessor, a CPU, and a processor configured to control the traveling of the vehicle.

The first and second controllers 162 and 170 may be implemented as an algorithm for controlling the constituent elements contained in the vehicle, a memory (not shown) for storing data regarding a program implementing the algorithm, and a processor (not shown) for performing the above-mentioned operation using data stored in the memory.

The second controller 240 may be implemented using a memory (not shown) configured to store data for algorithms to control operation of elements of the vehicle 1 or programs constructed from algorithms, and a processor (not shown) configured to execute the operation by using data stored in the memory. In this case, the memory and the processor may be implemented using separate chips or integrated into a single chip.

The communication interface 180 may communicate with the smart key 2. The communication interface 180 may perform communication in a wired or wireless manner. The communication interface 180 may perform at least one of Controller Area Network (CAN) communication, infrared communication, Radio Frequency Identification (RFID) communication, Wi-Fi communication, Bluetooth communication, and USB communication.

The power-supplier 190 may include a rechargeable battery 191. The power-supplier 190 is electrically connected to the charging unit 118 and an external power source, receive a power of the external power source, and perform the charging operation of the batter using the received power. The power-supplier 190 may be charged wirelessly or via a cable connected to a plug (not shown) or a socket (not shown).

When the charging hole of the charging unit is electrically and mechanically connected to a wire plug of an external charger arranged in a parking lot or charging station, the power-supplier perform the charging operation of the battery 191.

The power-supplier 190 may further include a plug for providing power of the battery 191 as drive power of the external device.

The battery 191 can be rechargeable, and may receive power from the external power source by wire or wirelessly so that the battery 191 can be recharged. The battery 191 may be discharged when supplying drive power to the constituent elements embedded in the vehicle.

The power-supplier 190 may further include an inverter for converting a direct current (DC) of the battery 191 into alternating current (AC) so as to drive the motor and a generator, and a converter for converting power of the battery 191 into the drive power of the constituent elements. The power-supplier 190 may include the plug connectable to a wire plug of an external charger arranged in a parking lot or charging station.

The brightness setting of the light control apparatus provided in the vehicle and the lighting control method of the lighting unit will be described with reference to FIG. 6

Figure 6:
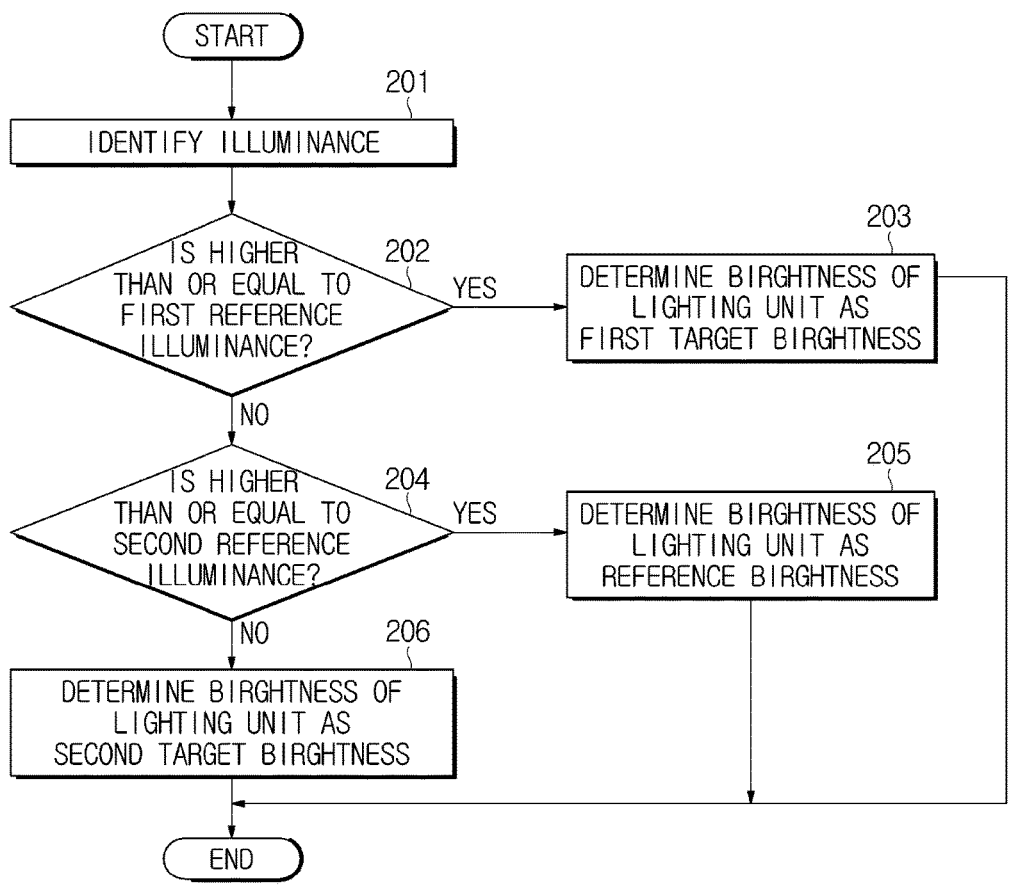

FIG. 6 is a flowchart illustrating a method for the light control apparatus of the vehicle according to embodiments of the present disclosure. That is, FIG. 6 is a flowchart illustrating a method for determining a brightness of the lighting unit based on the detected illuminance.

The light control apparatus identifies the illuminance detected by the illuminance detector (201). The illuminance detected by the illuminance detector may be an illuminance of the space where the vehicle is located. The light control apparatus compares the detected illuminance to the first reference illuminance.

When the detected illuminance is higher than or equal to the first reference illuminance (202), the light control apparatus determines a brightness of the first lighting unit and the second lighting unit as the first target brightness (da) (203). When the detected illuminance is lower than to the first reference illuminance, the light control apparatus compares the detected illuminance to the second reference illuminance, and determines whether the detected illuminance is higher than or equal to the second reference illuminance (204).

When the detected illuminance is higher than or equal to the second reference illuminance, the light control apparatus determines a brightness of the first lighting unit and the second lighting unit as the reference brightness (r) (205). When the detected illuminance is lower than to the second reference illuminance, the light control apparatus determines a brightness of the first lighting unit and the second lighting unit as the second target brightness (db) (206).

The second reference illuminance is lower luminance than the first reference illuminance. The first reference illuminance may be an average illuminance in outside space in daytime. The second reference illuminance may be an average illuminance in nighttime or an average illuminance in a dark inside space.

The first target brightness may be an average brightness that can improve the visibility of the user in an outside space in the daytime. The second target brightness may be an average brightness that can improve the visibility of the user in the nighttime or the dark inside space. The first target brightness is brighter than the reference brightness and the second target brightness. The second target brightness is darker than the reference brightness Embodiments of the present disclosure can improve the visibility of the lighting unit by increasing the brightness of the lighting unit in a bright outside space and lowering the brightness of the lighting unit in the dark inside space.

FIG. 7 is a flowchart illustrating a method for adjusting a brightness of lighting unit based on recognition information of the smart key and opening/closing information of the charging cap.

The light control apparatus determines a brightness of the first lighting unit and the second lighting unit as any one of the first target brightness (da), the second target brightness (db) and the reference brightness (r) based on the illuminance detected by the illuminance detector (211).

The light control apparatus determines whether the smart key is identified (212). When the smart key is not identified, the light control apparatus maintains the brightness of the first lighting unit and the second lighting unit as the determined brightness.

That is, the light control apparatus maintains the brightness of the first lighting unit and the second lighting unit as any one of the first target brightness (da), the second target brightness (db) and the reference brightness (r) (213). The determining whether the smart key is identified includes determining whether the communication with the smart key is performed.

The determining whether the smart key is identified includes determining whether the user is present around the vehicle. That the smart key is not identified represents that the user is absent around the vehicle. When the smart key is identified, the light control apparatus determines that the user is present around the vehicle. When the smart key is not identified, the light control apparatus determines that the user is absent around the vehicle.

The light control apparatus turns on the plurality of lamps of the second lighting unit as the determined brightness (214).

The light control apparatus identifies whether or not the charging cap is in the opening state. When the charging cap is in the opening state (215), the light control apparatus turns on the plurality of lamps of the first lighting unit as the determined brightness (216).

When the smart key is identified, the light control apparatus adjusts the determined brightness based on the first predetermined brightness. That is, the light control apparatus adjusts the brightness of the first lighting unit and the second lighting unit by increasing the determined brightness by the first predetermined brightness (217). The light control apparatus turns on the plurality of lamps of the second lighting unit as the adjusted brightness (da1, db1 or r1) (218).

The adjusting the brightness of the first lighting unit and the second lighting unit includes changing a brightness value of the determined brightness to a value brightness of the adjusted brightness by adding the first predetermined brightness to the determined brightness. The light control apparatus identifies whether or not the charging cap is in the opening state. When the charging cap is in the opening state (219), the light control apparatus turns on the plurality of lamps of the first lighting unit as the adjusted brightness (220).

When the brightness of the first lighting unit and the second lighting unit is determined as the first target brightness and the smart key is identified, the light control apparatus turns on the first lighting unit and the second lighting unit such that the first lighting unit and the second lighting unit emits light more brightly than the first target brightness by the first predetermined brightness. When the brightness of the first lighting unit and the second lighting unit is determined as the second target brightness and the smart key is identified, the light control apparatus turns on the first lighting unit and the second lighting unit such that the first lighting unit and the second lighting unit emits light more brightly than the second target brightness by the first predetermined brightness. When the brightness of the first lighting unit and the second lighting unit is determined as the reference brightness and the smart key is identified, the light control apparatus turns on the first lighting unit and the second lighting unit such that the first lighting unit and the second lighting unit emits light more brightly than the reference brightness by the first predetermined brightness.

The embodiments of the present disclosure can reduce power consumption and light pollution of the vehicle by increasing the brightness of the lighting unit when the user is present around the vehicle, and reducing the brightness of the lighting unit when the user is absent around the vehicle.

FIG. 8 is a flowchart illustrating a method for adjusting a brightness of lighting unit based on recognition information of the smart key and the charging mode of the battery.

The light control apparatus determines a brightness of the first lighting unit and the second lighting unit as any one of the first target brightness (da), the second target brightness (db) and the reference brightness (r) based on the illuminance detected by the illuminance detector. That is, the light control apparatus identify the determined brightness (231).

The light control apparatus determines whether the smart key is identified (232). When the smart key is not identified, the light control apparatus maintains the brightness of the first lighting unit and the second lighting unit as the determined brightness (233). That is, the light control apparatus maintains the brightness of the first lighting unit and the second lighting unit as any one of the first target brightness (da), the second target brightness (db) and the reference brightness (r).

The determining whether the smart key is identified includes determining whether the communication with the smart key is performed. The determining whether the smart key is identified includes determining whether the user is present around the vehicle. The determining whether the smart key is not identified includes determining whether the user is absent around the vehicle.

The light control apparatus identifies the charging mode of the battery. When the charging mode is the normal mode (234), the light control apparatus maintains the brightness of the first lighting unit and the second lighting unit as the determined brightness (da, db or r) (235), and turns on the plurality of lamps of the first lighting unit and the second lighting unit as the determined brightness (236).

The light control apparatus counts the charging time from the start time of the charging operation in the normal mode, and identifies the charging time counted from the start time of the charging operation.

If a predetermined time elapses from when a charging is started, the light control apparatus blinks the first lighting unit and the second lighting unit for a preset time. It is possible for the user to recognize that the battery is being charged stably by blinking the first lighting unit and the second lighting unit for the preset time.

The predetermined time elapsed from when a charging is started, the light control apparatus turns on the first lighting unit and the second lighting unit lighted such that the first lighting unit and the second lighting unit emits light more brightly than the determined brightness for the preset time. It is possible for the user to recognize that the battery is being charged stably by lighting the first lighting unit and the second lighting unit for the preset time.

The brightness of the first lighting unit and the second lighting unit brighter than the determined brightness may equal to the adjusted brightness (da1, db1 or r1), or may be darker than the adjusted brightness (da1, db1 or r1).

When the preset times, the light control apparatus changes the brightness of the first lighting unit and the second lighting unit as the determined brightness.

The light control apparatus identifies the charging mode of the battery. When the charging mode is the reservation mode, the light control apparatus identifies the scheduled time, the predetermined time prior to the scheduled time and the present time, and compares the predetermined time prior to the scheduled time to the present time.

When the present time is the predetermined time prior to the scheduled time, the light control apparatus adjusts the brightness of the first lighting unit and the second lighting unit by increasing the determined brightness by the second predetermined brightness (237), and turns on the first lighting unit and the second lighting unit as the adjusted brightness (da1, db1 or r1). (238). That is, the light control apparatus turns on the plurality of lamps of the first lighting unit and the second lighting unit as the adjusted brightness.

When the present time is the scheduled time, the light control apparatus turns on the plurality of lamps of the first lighting unit and the second lighting unit as the determined brightness. The predetermined time elapsed from when a charging is started in reservation mode, the light control apparatus turns on the lighting unit such that the lighting unit emits light more brightly than the determined brightness for the preset time. The predetermined time elapsed from when a charging is started in reservation mode, the light control apparatus may blink the lighting unit more brightly than the determined brightness for the preset time. It is possible for the user to recognize that the battery is being charged stably by blinking or lighting the first lighting unit and the second lighting unit for the preset time.

The brightness brighter than the determined brightness may equal to the adjusted brightness (da1, db1 or r1), or may be darker than the adjusted brightness (da1, db1 or r1).

The light control apparatus determines whether the charging state of the battery is the charging failure state of the battery based on the amount of charge of the battery.

When the charging state of the battery is the charging failure state, the light control apparatus adjusts the brightness of the first lighting unit and the second lighting unit by increasing the determined brightness by the second predetermined brightness, and turns on the first lighting unit and the second lighting unit as the adjusted brightness (da1, db1 or r1). The light control apparatus may blink the first lighting unit and the second lighting unit as the adjusted brightness (da1, db1 or r1).

When the smart key is identified, the light control apparatus adjusts the determined brightness based on the first predetermined brightness. That is, the light control apparatus adjusts the brightness of the first lighting unit and the second lighting unit by increasing the determined brightness by the first predetermined brightness (239).

The determining whether the smart key is identified includes determining whether the user is present around the vehicle.

The light control apparatus identifies the charging mode of the battery. When the charging mode is the normal mode (240), the light control apparatus maintains the brightness of the first lighting unit and the second lighting unit as the adjusted brightness (da1, db1 or r1) (241), and turns on the plurality of lamps of the first lighting unit and the second lighting unit as the adjusted brightness (242). That is, the light control apparatus turns on the brightness of the plurality of lamps of the first lighting unit and the second lighting unit as the adjusted brightness (da1, db1 or r1).

If the predetermined time elapsed from when a charging is started, the light control apparatus blinks the first lighting unit and the second lighting unit for the preset time. It is possible for the user to recognize that the battery is being charged stably by blinking the first lighting unit and the second lighting unit for the preset time.

The predetermined time elapsed from when a charging is started, the light control apparatus turns on the lighting unit more brightly than the determined brightness for the preset time. It is possible for the user to recognize that the battery is being charged stably by lighting the first lighting unit and the second lighting unit for the preset time.

When the preset time elapses, the light control apparatus changes the brightness the first lighting unit and the second lighting unit as the determined brightness. When the charging mode is the reservation mode, the light control apparatus identifies the scheduled time, the predetermined time prior to of the scheduled time and the present time, and compares the predetermined time prior to the scheduled time to the present time. When the present time is the predetermined time prior to the scheduled time, the light control apparatus readjusts the brightness of the first lighting unit and the second lighting unit by increasing the adjusted brightness by the second predetermined brightness (243), and turn on the first lighting unit and the second lighting unit as a readjusted brightness (da2, db2 or r2). (244).

The readjusting the brightness of the first lighting unit and the second lighting unit includes changing a brightness value of the adjusted brightness to a value brightness of the readjusted brightness by adding the second predetermined brightness to the adjusted brightness.

When the present time is the scheduled time, the light control apparatus turns on the plurality of lamps of the first lighting unit and the second lighting unit as the adjusted brightness (da1, db1 or r1).

The predetermined time elapsed from when a charging is started in reservation mode, the light control apparatus controls at least one of lighting operation and blinking operation of the lighting unit as the adjusted brightness for the preset time. It is possible for the user to recognize that the battery is being charged stably by blinking or lighting the first lighting unit and the second lighting unit for the preset time.

When the charging state of the battery is the charging failure state, the light control apparatus readjusts the brightness of the first lighting unit and the second lighting unit by increasing the adjusted brightness by the second predetermined brightness, and turns on the first lighting unit and the second lighting unit as the readjusted brightness (da2, db2 or r2). The light control apparatus may blink the first lighting unit and the second lighting unit as the readjusted brightness (da2, db2 or r2).

When lighting the lighting unit, the light control apparatus may be capable of lighting the charging failure state and the charging entrance state and the charging start state during the reservation mode in different colors.

Embodiments of the present disclosure can allow the user to easily recognize the charging mode and the charging state by controlling the lighting operation of the lighting unit based on the charging mode and the charging state of the battery.

As described above, the embodiments of the present disclosure can increase the quality and marketability of the vehicle having the light control apparatus for controlling the lighting unit, can increase user satisfaction, and can guarantee product competitiveness. As is apparent from the above description, the present disclosure can improve visibility of the lighting unit for displaying the charging state of the battery by controlling the brightness of the lighting unit according to the environment of the vehicle, such as the illuminance of the parking place of the vehicle.

Moreover, the present disclosure can reduce power consumption and light pollution of the vehicle by increasing the brightness of the lighting unit when the user is present around the vehicle, and reducing the brightness of the lighting unit when the user is absent around the vehicle. The present disclosure can also allow a user to easily recognize the charging mode and the charging state of the battery by controlling the lighting operation of the lighting unit based on the charging mode and the charging state of the battery. As described above, the embodiments of the present disclosure can increase the quality and marketability of the vehicle having the light control apparatus for controlling the lighting unit, can increase user satisfaction.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A light control apparatus for controlling brightness of a lighting unit indicating a charging state of a battery of a vehicle, the light control apparatus comprising:
    an interface configured to communicate with an external illuminance detector;
    a memory configured to store illuminance information corresponding to a first reference illuminance and a second reference illuminance lower than the first reference illuminance and to store brightness information set based on the first reference illuminance and the second reference illuminance;
    a controller configured to receive the illuminance information via the interface, to set the brightness information based on the first reference illuminance and the second reference illuminance, and to control the brightness of the lighting unit based on the set brightness information; and
    a driver configured to regulate power of the lighting unit in response to a command of the controller,
    wherein the controller is further configured to control the driver so that the lighting unit emits light brighter than a brightness according to the set brightness information at a predetermined time prior to a scheduled time when a charging mode of the battery is a reservation mode.

2. The light control apparatus according to claim 1, wherein the brightness information includes: i) a first target brightness corresponding to an illuminance higher than or equal to the first reference illuminance, ii) a second target brightness corresponding to an illuminance lower than the second reference illuminance, and iii) a reference brightness corresponding to an illuminance higher than or equal to the second reference illuminance and lower than the first reference illuminance.

3. The light control apparatus according to claim 1, wherein the controller is further configured to control the driver so that the lighting unit emits light brighter than a brightness according to the set brightness information after a predetermined time elapses from when a charging is started.

4. The light control apparatus according to claim 1, wherein the controller is further configured to control the driver so that the lighting unit emits light brighter than a brightness according to the set brightness information when a charging state of the battery is a charging failure state.

5. A vehicle comprising:
    a rechargeable battery;
    a motor configured to generate a torque using power of the battery and to transmit the generated torque to a wheel of the vehicle;
    a lighting unit configured to indicate a charging state of the battery;
    a memory configured to store illuminance information corresponding to a first reference illuminance and a second reference illuminance lower than the first reference illuminance and to store brightness information set based on the first reference illuminance and the second reference illuminance;
    an illuminance detector configured to detect an illuminance;
    a controller configured to set the brightness information based on the first reference illuminance and the second reference illuminance, and to control brightness of the lighting unit based on the set brightness information; and
    a driver configured to regulate power of the lighting unit in response to a command of the controller,
    wherein the controller is further configured to control the driver so that the lighting unit emits light brighter than a brightness according to the set brightness information at a predetermined time prior to a scheduled time when a charging mode of the battery is a reservation mode.

6. The vehicle according to claim 5, further comprising:
    a charge amount detector configured to detect an amount of charge of the battery, wherein
    the lighting unit includes a plurality of lamps,
    the memory is further configured to store information corresponding to a number of the plurality of lamps to be turned on for lighting operation based on the detected amount of charge of the battery, and
    the controller is further configured to the lighting operation of at least one of the plurality of lamps based on the information stored in the memory and the detected amount of charge of the battery.

7. The vehicle according to claim 5, wherein the brightness information stored in the memory includes: i) a first target brightness corresponding to an illuminance higher than or equal to the first reference illuminance, ii) a second target brightness corresponding to an illuminance lower than the second reference illuminance, and iii) a reference brightness corresponding to an illuminance higher than or equal to the second reference illuminance and lower than the first reference illuminance.

8. The vehicle according to claim 5, wherein the controller is further configured to adjust a brightness of the lighting unit such that the lighting unit emits light more brightly than the controlled brightness by a predetermined brightness when communication with the smart key is performed, to maintain the brightness of the lighting unit as the controlled brightness when the communication with the smart key is not performed, to control the driver such that the lighting unit emits light brighter than the adjusted brightness when the communication with the smart key is performed after a predetermined time elapses from when a charging is started, and to control the driver such that the lighting unit emits light brighter than the controlled brightness when the communication with the smart key is not performed after the predetermined time elapses from when the charging is started.

9. The vehicle according to claim 5, wherein the controller is further configured to adjust a brightness of the lighting unit such that the lighting unit emits light more brightly than the controlled brightness by a predetermined brightness when communication with the smart key is performed, to maintain the brightness of the lighting unit as the controlled brightness when the communication with the smart key is not performed, to control the driver such that the lighting unit emits light brighter than the adjusted brightness when the communication with the smart key is performed and the charging state of the battery is the charging failure state, and to control the driver such that the lighting unit emits light brighter than the controlled brightness when the communication with the smart key is not performed and the charging state of the battery is the charging failure state.

10. The vehicle according to claim 5, wherein:
when the communication with the smart key is performed, the controller is further configured to adjust a brightness of the lighting unit such that the lighting unit emits light more brightly than the controlled brightness by a predetermined brightness and to determine whether the charging mode of the battery is the reservation mode,
when the charging mode of the battery is the reservation mode, the controller is further configured to determine whether a present time is prior to a scheduled time,
when the present time is prior to the scheduled time, the controller is further configured to control the driver such that the lighting unit emits light brighter than the adjusted brightness, and
when the communication with the smart key is not performed, the charging mode of the battery is the reservation mode, and the present time is prior to the scheduled time, the controller is further configured to maintain the brightness of the lighting unit as the controlled brightness and to control the driver such that the lighting unit emits light brighter than the controlled brightness.

11. The vehicle according to claim 5, wherein the lighting unit is provided in a dashboard.

12. The vehicle according to claim 5, wherein the lighting unit is provided in a charging unit, and the charging unit is connected to an external plug.

13. The vehicle according to claim 12, further comprising:
a charging cap provided in the charging unit;
an opening/closing detector configured to detect information corresponding to an opening state and closing state of the charging cap;
wherein the controller is further configured to determine whether the charging cap is in the opening state based on the detected information by the opening/closing detector, when the charging cap is in the opening state, to activate a lighting operation of the lighting unit, and when the charging cap is in the closing state, to activate an off-operation of the lighting unit.

14. A method for controlling a vehicle including a battery and a motor, the method comprising:

identifying a state of the battery;
activating an on-operation or an off-operation of a lighting unit based on the identified state of the battery;
detecting an external illuminance;
determining a first reference illuminance and a second reference illuminance lower than the first reference illuminance, the first reference illuminance and the second reference illuminance stored in a memory;
setting brightness information based on the first reference illuminance and the second reference illuminance;
controlling brightness of the lighting unit based on the detected illuminance, the first reference illuminance, the second illuminance and the determined brightness information of the light unit;
adjusting the brightness of the lighting unit to be brighter than the adjusted brightness after a predetermined time elapses from when a charging is started;
maintaining the brightness of lighting unit as the adjusted brightness during a preset time; and
adjusting the brightness of the lighting unit according to the adjusted brightness when the preset time elapses.

15. The method according to claim 14, wherein a plurality of brightness levels includes: i) a first target brightness corresponding to an illuminance higher than or equal to the first reference illuminance, ii) a second target brightness corresponding to an illuminance lower than the second reference illuminance, and iii) a reference brightness corresponding to an illuminance higher than or equal to the second reference illuminance and lower than the first reference illuminance, wherein
the first target brightness is higher than the reference brightness and the second target brightness,
the second target brightness is lower than the reference brightness, and
the setting of the brightness information includes:
determining the brightness of the lighting unit as the first target brightness when the external illuminance is higher than or equal to the first reference illuminance,
determining the brightness of the lighting unit as the second target brightness when the external illuminance is lower than the second reference illuminance, and
determining the brightness of the lighting unit as the reference target brightness when the external illuminance is higher than or equal to the second reference illuminance and is lower than the first reference illuminance.

16. The method according to claim 15, further comprising:
determining whether communication with a smart key is performed; and
adjusting the determined brightness based on a predetermined brightness when the communication with the smart key is performed.

17. The method according to claim 15, further comprising:
identifying a charging mode of the battery;
determining whether a present time is prior to a scheduled time when the charging mode of the battery is a reservation mode; and
adjusting power of a driver such that the lighting unit emits light brighter than a brightness according to the set brightness information when the present time is prior to a scheduled time.

18. The method according to claim 15, further comprising, determining whether the battery state is a charging failure state based on the identified amount of charge; and adjusting the brightness of the lighting unit to be brighter than the determined brightness when the battery state is a charging failure state.

19. The method according to claim 14, wherein the activating of the on-operation or the off-operation of the lighting unit includes:

controlling an on-operation of a plurality of first lamps of the first lighting unit provided in a charging unit, and a plurality of second lamps of a second lighting unit provided in a dashboard.

* * * * *